United States Patent [19]

Humphrey

[11] 3,845,387

[45] Oct. 29, 1974

[54] NON-REACTIVE ELECTROMAGNETIC SENSOR

[75] Inventor: Leonard C. Humphrey, Baldwinsville, N.Y.

[73] Assignee: The United States of America as represented by the Secretary of the Army, Washington, D.C.

[22] Filed: Aug. 27, 1973

[21] Appl. No.: 392,161

[52] U.S. Cl. .................. 324/95, 324/58 R, 333/10
[51] Int. Cl. ...................... G01r 21/02, G01r 27/06
[58] Field of Search ........ 324/95, 58 B, 58 R, 58 A; 333/10, 6

[56] References Cited
UNITED STATES PATENTS

| | | | |
|---|---|---|---|
| 2,762,980 | 9/1956 | Kumpfer | 324/95 |
| 2,901,709 | 8/1959 | Fitzmorris | 324/95 |
| 3,678,381 | 7/1972 | Beaudry | 324/58 B |

*Primary Examiner*—Michael J. Lynch
*Assistant Examiner*—Ernest F. Karlsen
*Attorney, Agent, or Firm*—Lawrence A. Neureither; Jack W. Voigt; Robert C. Sims

[57] ABSTRACT

The sensor consists of a rhombic plate having its larger diagonal aligned with the direction of propagation of the electromagnetic wave. This plate is spaced from a transmission line plate and has connections at the ends of its length through the transmission line plate to two readout devices. Readout devices consists of RC integrators connected to an oscillator.

4 Claims, 5 Drawing Figures

PATENTED OCT 29 1974　　3,845,387 though this does not affect the analysis. The equivalent circuits for the electric and magnetic response are shown in FIGS. 3 and 4. The magnetic response is due to time derivative of the B field through the coupler loop and is given by

NON-REACTIVE ELECTROMAGNETIC SENSOR

SUMMARY OF THE INVENTION

In a waveguide it is desirable to know the relative values of the incident and reflected waveforms between the transmission line plates. A rhombic coupler plate bent at its smaller diagonal is supported above one of the transmission line plates at the corners of its larger diagonal which are connected through the transmission line plate. The long length of the coupler plate is aligned with the direction of propagation of the signal. The triangular end pieces form terminals on the other side of the transmission line plate which are insulated therefrom. In one application of the invention a pair of meters are individually connected between these terminals and the transmission line plate. The reading on the meters will be proportional to either the incident wave or the reflected wave. A meter placed at a terminal on the side of the plate which faces the direction of the incident wave will have a measurement proportional to it and it alone. The other terminal will have a reading from a meter placed thereto proportional to the reflected waveform only.

The coupler plate will measure the time derivative of the fields of the waveforms; therefore two RC integrators may be used to recover the waveforms. Oscilloscopes are connected to outputs of the integrators. These integrators will be connected in parallel between the terminals and the transmission line plate.

DESCRIPTION OF THE PREFERRED EMBODIMENT

Figure 1:
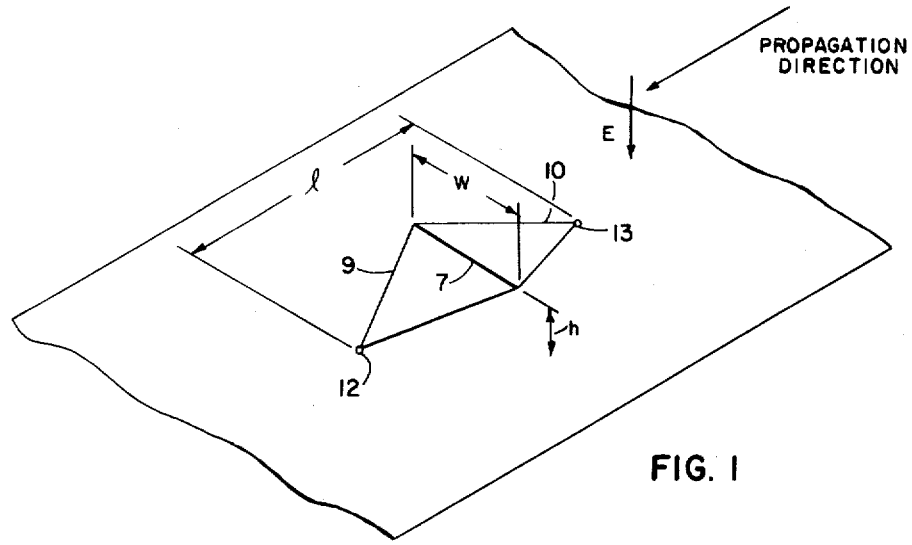
FIG. 1 shows a preferred embodiment of the present invention.
Figure 2:
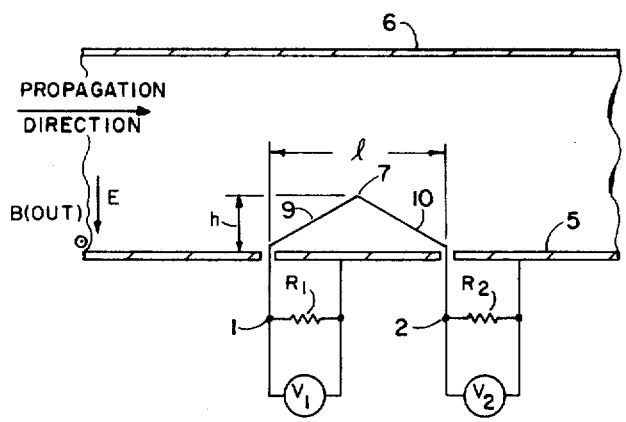
FIG. 2 is a side view of the coupler with the connections thereto shown in schematic.

FIG. 1 shows the sensor and one of the transmission line plates 5. The sensor consists of a rhombic coupler plate 7 which has a minor diagonal width $w$ and a major diagonal length 1 as shown in FIG. 1. The length of the coupler plate is in parallel with the propagation direction of the waveform to be tested. The coupler plate is bent about its minor diagonal forming two triangles 9 and 10 with a common at the edge at the bend which parallel to the transmission plate and traverse to the propagation direction. The width and the length of the coupler plate 7 are small compared to the transmission line dimensions. The sensor is in the order of ⅛ wavelength at its largest dimension. Two triangular sides 9 and 10 of the rhombus meet at the common edge at a height h above the transmission line plate 5. The ratio of height depends on the desired characteristic impedance: 1 to 5 for 50 ohms; 1 to 2 for 90 ohms; and 1 to 1 for 125 ohms. The sides 9 and 10 are connected through the transmission line plate by insulators 12 and 13. FIG. 2 shows how these sides of the coupler plate connect through the transmission line plate 5 to terminals 1 and 2. The other transmission line plate 6 is also shown in FIG. 2.

The electromagnetic sensor or directional coupler is essentially a combined E field, and B field sensor, as delineated in FIGS. 1 and 2. These Figures show the coupler mounted on one plate of a parallel plate transmission line in which the E and H (or B) fields of an incident wave are also shown. The E field response of the coupler is through the capacitance of the directional coupler plate to the transmission line plate, while the B field response is through the loop response to the changing B field. These voltage responses of the sensor to the incident waveform depends on the loading as shown in FIG. 2.

Figure 3:
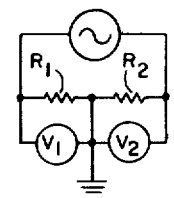
FIG. 3 is a schematic showing of the magnetic field response of the present invention.
Figure 4:
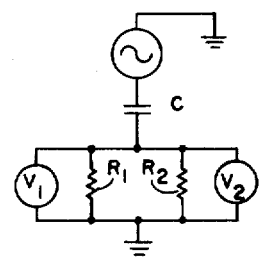
FIG. 4 is a schematic showing of the electric field response of the present invention.

FIG. 2 is actually a side view of the coupler along with a schematic of the loads and voltages of interest. The actual load resistances, R1 and R2 are actually at the end of instrumentation cables of characteristic impedance (see FIG. 5), but this does not affect the analysis. The equivalent circuits for the electric and magnetic response are shown in FIGS. 3 and 4. The magnetic response is due to time derivative of the B field through the coupler loop and is given by $$V_m = A \, (dB/dt) = hl \, (dB/dt) \times \tfrac{1}{2}$$

(1)

where

A = the loop area = $h \times l \times \tfrac{1}{2}$ $h$ and $l$ = height and length of coupler (see FIG. 1)

$V_m$ = is the total voltage ($\int E \cdot ds$) around the loop

The current $i$, through the identical load resistors R is given by the differential equation $$V_m = 2Ri + L \, (di/dt)$$

(2)

where L is the inductance of the coupler loop.

From (2) we may see that if $R/L \gg (di/dt)/dt$ that the second term in equation (2) may be neglected, and substitution in (1) gives $$\tfrac{1}{2} \, hl \, (dB/dt) = 2Ri = 2V_1 = -2V_2$$

The voltage response is thus given by $$V_{m1} = -V_{m2} = hl \, (dB/dt)/4$$

(3)

where the positive direction for B is assumed "out of the paper," and voltage $V_1$ and $V_2$ are with respect to the transmission line plate.

The electric response is due to the vertical electric field, and is given by:

$$V_e = hE$$

(4)

The current differential equation is given by reference to FIG. 4:

$$dV_e/dt = i/c + R/2 \, di/dt$$

(5)

If we now assume $1/RC \gg (di/dt)/dt$ we may neglect the second term and write using (4)

$$i_1 + i_2 = i = C \, dV_e/dt = C \, h/2 \, dE/dt$$

so that $$V_{e1} = V_{e2} = Ri/2 = CRh/4 \, dE/dt \tag{6}$$

The total (electric and magnetic) response at terminal 1 is:

$$V_1 = V_{m1} + V_{e1} = h/4 \, (l(dB/dt) + CR \, (dE/dt)) \tag{7}$$

and at terminal 2:

$$V_2 = V_{e2} + V_{m2} = h/4 \, (CR \, (dE/dt) - l \, (dB/dt)) \tag{8}$$

In a plane wave propagating from left to right in FIG. 2, E and B are related by $$E = \xi H = \xi B/\mu \tag{9}$$

where
$\xi$ = free space impedance $\sqrt{\mu/\epsilon}$ 120$\pi$
$\epsilon$ = capacitivity of free space
$\mu$ = permeability of free space = $4\pi \times 10^{-7}$
Substitute (9) into 8

$$V_2 = h/4 \, (RC\xi/\mu - l) \, dB/dt = 1/4 \, ((RC/l \, \mu\epsilon) - 1) \, hl \, (dB/dt) \tag{10}$$

From equation 10, it is seen that $V_2$ vanishes if we make $$R = l \, \sqrt{\mu\epsilon}/C = W/h \, \sqrt{\mu/\epsilon} = R_o \tag{11}$$

where W is the coupler width.
$R_o$ is characteristic impedance of the coupler.
Substituting this value of R into equation (8) gives $$V_1 = \tfrac{1}{2} \, lh \, (dB/dt) = A \, (dB/dt) \tag{12}$$

For a plane wave propagating in the direction from terminal 1 to terminal 2, it is seen that the response at terminal 1 is given by (12) and that at terminal 2 vanishes. For a wave propagating in the opposite direction the responses are reversed. Thus, incident and reflected plane waves may be measured separately.

Figure 5:
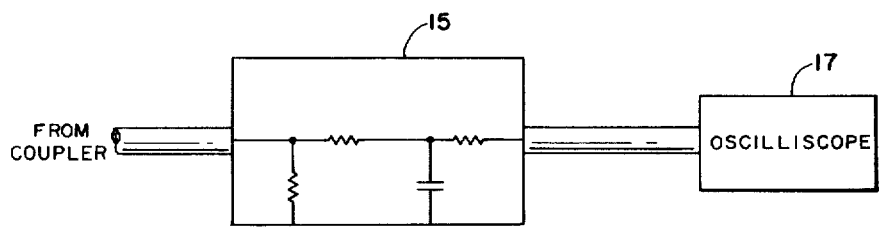
FIG. 5 is a schematic showing of the RC circuit along with the connections to the oscillator.

As is seen in equation (12), the sensor actually measures the time derivative of the field of the waveform being measured. A simple RC integrator may be used to recover the incident waveform. FIG. 5 shows one RC integrator 15 which may be used to recover the waveform. Two integrators will be used one will be connected to terminal 1 and the other will be connected to terminal 2. The output of the integrator can be fed to an oscilloscope 17 for visual showing of the waveform. Any of the well known integrators or oscilloscopes may be used.

The sensor may also be used as a B dot $dB/dt$ sensor by substituting a short circuit for one of the terminating resistors and may be used as and E dot $dE/dt$ sensor by substituting an open circuit. In both cases the source will have minimum reactance over a very wide bandwidth.

I claim:

1. In a system for measuring field strengths of incident and reflected waveforms from a signal being propagated through a transmission line which contains at least one plate; the improvement comprising a sensor having length and width dimensions; first and second supporting means connected to opposite sides of the length dimension of said sensor so as to support said sensor in spaced relationship above one plate of the transmission line; said first and second supporting means supporting said sensor such that its length dimension is in parallel with the propagation direction of the signal; said sensor having a configuration of a rhombic plate bent at its smaller diagonal so as to provide a constant characteristic impedance for its entire length above said one plate of the transmission line; first and second terminal means located on the opposite side of said one plate from said sensor; and said first and second supporting means also serving to connect the ends of said sensor through said one plate of the transmission line to said first and second terminals.

2. A system as set forth in claim 1 further comprising first and second insulators mounted in said transmission line plate such that said first and second supporting means may provide connections through the transmission line plate to said first and second terminals without making contact to said transmission line plate.

3. A system as set forth in claim 2 further comprising first and second detecting means each having an input and an output connected respectively between said first and second terminals and said transmission line plate.

4. A system as set forth in claim 3 wherein said first and second detector means comprises first and second integrators having outputs and inputs connected respectively across said first and second terminals and said transmission line plate; and first and second oscilloscopes having inputs connected respectively to outputs of said first and second integrators.

* * * * *